(12) United States Patent
Schmidt

(10) Patent No.: US 7,058,040 B2
(45) Date of Patent: Jun. 6, 2006

(54) CHANNEL INTERFERENCE REDUCTION

(76) Inventor: Dominik J. Schmidt, 580 Arastradero Rd., Palo Alto, CA (US) 94306

( * ) Notice: Subject to any disclaimer, the term of this patent is extended or adjusted under 35 U.S.C. 154(b) by 893 days.

(21) Appl. No.: 09/962,718

(22) Filed: Sep. 21, 2001

(65) Prior Publication Data

US 2003/0058830 A1   Mar. 27, 2003

(51) Int. Cl.
  *H04B 7/212* (2006.01)
  *H04Q 7/24* (2006.01)
(52) U.S. Cl. ............... 370/337; 370/338; 370/347
(58) Field of Classification Search ........... 370/329, 370/330, 331–334, 338, 341, 347, 349
  See application file for complete search history.

(56) References Cited

U.S. PATENT DOCUMENTS

| | | | |
|---|---|---|---|
| 5,625,877 A | 4/1997 | Dunn et al. ............... 455/454 |
| 5,625,889 A | 4/1997 | Chikkaswamy et al. . 455/67.11 |
| 5,655,217 A | 8/1997 | Lemson |
| 5,805,982 A | 9/1998 | Hulsebosch ............... 455/62 |
| 5,960,354 A | 9/1999 | Einola .................. 455/454 |
| 6,081,168 A | 6/2000 | Park .................... 331/179 |
| 6,374,112 B1 | 4/2002 | Widegren et al. ......... 455/452.2 |
| 6,377,608 B1 * | 4/2002 | Zyren ................... 375/132 |
| 6,430,395 B1 | 8/2002 | Arazi et al. ............. 455/41.2 |
| 6,452,910 B1 * | 9/2002 | Vij et al. ............... 370/310 |
| 6,563,910 B1 | 5/2003 | Menard et al. ............ 379/45 |
| 6,597,672 B1 | 7/2003 | Gustafsson et al. ....... 370/329 |
| 6,600,726 B1 * | 7/2003 | Nevo et al. ............. 370/278 |
| 6,650,871 B1 | 11/2003 | Cannon et al. .......... 455/41.2 |
| 6,745,018 B1 * | 6/2004 | Zehavi et al. ........... 455/296 |
| 6,826,387 B1 * | 11/2004 | Kammer ................ 455/41.2 |
| 2001/0010689 A1 * | 8/2001 | Awater et al. ........... 370/344 |
| 2002/0028655 A1 | 3/2002 | Rosener et al. ........... 455/16 |
| 2002/0068570 A1 * | 6/2002 | Abrol et al. ............. 455/438 |
| 2002/0197998 A1 | 12/2002 | Schmidt ............... 455/452.1 |
| 2003/0035388 A1 | 2/2003 | Schmidt ................ 370/329 |

* cited by examiner

*Primary Examiner*—Chau Nguyen
*Assistant Examiner*—Soon D. Hyun

(57) ABSTRACT

A method for data transmission over first and second media that overlaps in frequency includes computing one or more time division multiple access (TDMA) time-slot channels to be shared between the first and second media for data transmission; allocating one or more time-slot channels to the first medium for data transmission; allocating one or more of the remaining time-slot channels to the second medium for data transmission; and instructing transceivers for the first and second media to communicate only in their allocated time-slot channels.

16 Claims, 6 Drawing Sheets

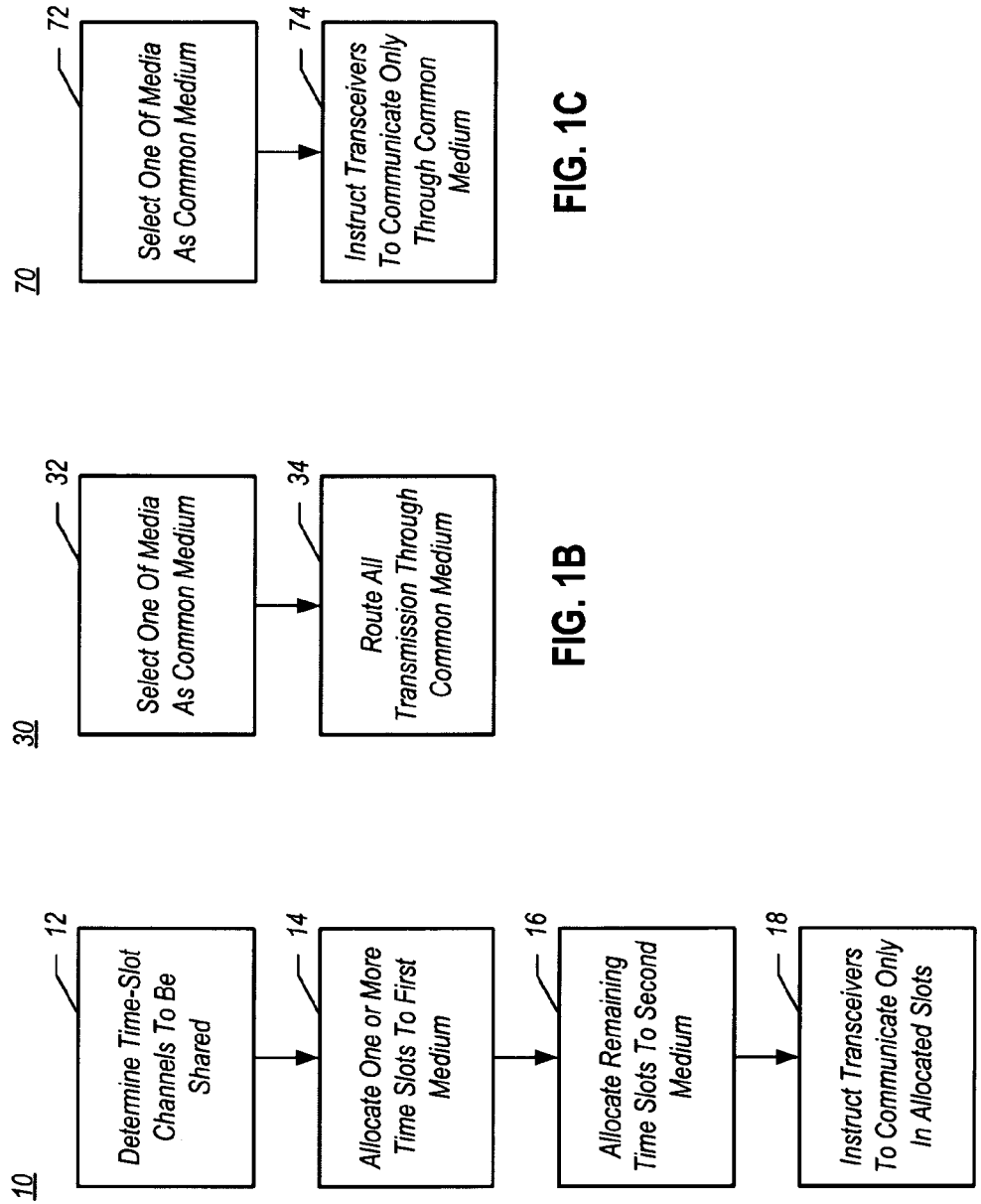

CHANNEL INTERFERENCE REDUCTION

BACKGROUND

The invention relates to minimizing RF channel interence.

The number of products incorporating the recently approved Bluetooth wireless standard is expected to explode during the first couple years of the new millennium. Bluetooth, which establishes wireless connections between devices such as mobile phones, PDAs, and headsets, operates at relatively low data rates over short distances using very little power. On the other hand, IEEE 802.11 is a wireless LAN standard approved by IEEE a couple years ago and operates at higher data rates over longer distances using more power. Companies today are strongly benefiting from using 802.11-compliant wireless LANs to support efficient mobile communications between handheld data collectors and corporate IS databases.

Because of a high demand for both wireless PANs and LANs, it's important that Bluetooth and 802.11 coexist in close proximity. A current problem, though, is that the two standards operate in the same 2.4 GHz unlicensed radio band and equally use frequency hopping modulation. This commonality poses a strong potential for radio frequency interference.

Interference happens when Bluetooth and 802.11 devices transmit at the same time near each other. This causes a destruction of data bits, prompting the system to retransmit entire data packets. A wireless LAN node (like Bluetooth or 802.11) that works on a principle of carrier sensing will not transmit when it senses other stations transmitting. If placed in close proximity to 802.11-based wireless LANs, Bluetooth could cause interference. Modern LANs keep working despite such interference, but performance can suffer. Much design effort in Bluetooth—including limits on physical range and use of spread-spectrum frequency hopping—went toward avoiding conflict with other transmission schemes.

The likelihood is that Bluetooth products will likely jam the operation of 802.11, not the other way around. The reason is that Bluetooth hops through frequencies 600 times faster than 802.11. While an 802.11 device is transmitting on a particular frequency, a nearby Bluetooth product will most likely interfere with the 802.11 transmission many times before the 802.11 device hops to the next frequency. This barrage of radio signals emanating from Bluetooth products could seriously degrade the operation of an 802.11 network.

Additionally, other wireless products such as GPS can also cause interference. Bluetooth works in the 2.4-GHz range of the radio band, which is not licensed by the FCC and is inhabited by cell phones, baby monitors and the IEEE 802.11 LAN. With multiple independently operated radio frequency systems, potential problems arise, including self-jamming, inter-modulation products, increased shielding requirements, tight filtering requirements, among others. For example, the Bluetooth band is around 2.4 Ghz. One of the cellular bands is around 900 Mhz. In many Bluetooth transmitters, the waveform is modulated at 1.2 GHz and multiplied by two to get to 2.4 GHz band. Additionally, a number of wireless transceivers use local oscillators that are at around 1 to 1.1 GHz to give an intermediate frequency (IF) of about 100–200 MHz The RF frequency is thus about 1.2 GHz. Hence, when Bluetooth and wireless transceivers operate simultaneously, potential RF interference problems exist.

SUMMARY

In one aspect, a method for data transmission over first and second media that overlap in frequency includes computing one or more time division multiple access (TDMA) time-slot channels to be shared between the first and second media for data transmission; allocating one or more time-slot channels to the first medium for data transmission; allocating one or more of the remaining time-slot channels to the second medium for data transmission; and instructing transceivers for the first and second media to communicate only in their allocated time-slot channels.

Implementations of the above aspect may include one or more of the following. One of the medium conforms to an 802.11 specification, while the other medium conforms to a Bluetooth specification. The first and second media operate at approximately 2.4 gigahertz. The system can also (a) determine a desired level of service for one of the media during a transmission; and (b) dynamically adjust a number of time slots assigned to the media during the transmission to remain within limits of said desired level of service. The dynamic adjusting can further include determining available time-slot resources; detecting the medium that fails to meet said desired level of service; allocating the medium to a configuration having additional time slots; and transmitting an additional channel assignment message including information on the allocated configuration with the additional time slots. The transceivers for the first and second media can be instructed to communicate only in their newly allocated time-slots. In a second aspect, a method for data transmission over first and second media that overlap in frequency includes selecting one of the first and second media as a common medium; and routing the data transmission through the common medium.

In yet a third aspect, a method for data transmission over first and second media that overlap in frequency includes selecting one of the first and second media as a common medium; and instructing transceivers for the first and second media to communicate only through the common medium.

Implementations of the above aspect may include one or more of the following. The method includes communicating on a short-range radio channel, wherein the short-range radio channel is Bluetooth or IEEE 802.11 (also known as Wireless Local Area Network or WLAN). The method can bond the short-range radio channel along with several cellular frequency channels to increase bandwidth. The cellular channels can consist of an uplink band around 890–915 MHz and a downlink band around 935–960 MHz. The method can bond two adjacent channels. Each band can be divided into 124 pairs of frequency duplex channels with 200 kHz carrier spacing using Frequency Division Multiple Access (FDMA). Another method, Time Division Multiple Access (TDMA) can split the 200 kHz radio channel into a plurality of time slots; bonding the time slots; and transmitting and receiving data in the bonded time slots. Cellular packet data can be transmitted in accordance with the following protocols: cellular digital packet data (CDPD) (for AMPS, IS-95, and IS-136), General Packet Radio Service (GPRS) and EDGE (Enhanced Data for Global Evolution).

Advantages of the system may include one or more of the following. The system allows an end-user of a mobile wireless device, such as a mobile phone or portable computer, to minimize interference and thus to transmit messages and information quickly over wireless channels. This is achieved by time-division multiplexing potentially interfering transmissions Transmission failure is minimized to effectively increase usable bandwidth so that content rich messages such as multimedia and video files may be transmitted quickly. The system transmits data at high effective data rates and that alleviates latencies concomitant with the time domain data overlay systems.

BRIEF DESCRIPTION OF THE DRAWINGS

The accompanying drawings, which are incorporated in and form a part of this specification, illustrate embodiments of the invention and, together with the description, serve to explain the principles of the invention FIG. 1A shows a process to wirelessly communicate data over a plurality of media that overlap in frequency.

FIG. 1B shows a process to wirelessly communicate data over a plurality of media that overlap in frequency.

FIG. 1C shows a third process to wirelessly communicate data over a plurality of media that overlap in frequency.

FIGS. 1A and 1B show processes that support wireless data communication over a plurality of transmission media that overlap each other in frequency. In one embodiment, the transmission media include Bluetooth and 802.11b media, both of which operate in the 2.4 GHz unlicensed radio frequency band. In one embodiment, a process 10 applies a TDMA process where each transmitter communicates in accordance with agreed upon time slot. In this embodiment, a system with Bluetooth transceivers and 802.11 transceivers can transmit data over Bluetooth and 802.11 (first and second) media that overlap, in this case at the 2.4 GHz frequency band. The process 10 computes one or more time division multiple access (TDMA) time-slot channels to be shared between the first and second media for data transmission (step 12). Next, the process 10 allocates one or more time-slot channels to the first medium for data transmission (step 14). The process 10 then allocates one or more of the remaining time-slot channels to the second medium for data transmission (step 16). The process instructs transceivers for the first and second media to communicate only in their allocated time-slot channels (step 18).

DESCRIPTION

Figure 1D:
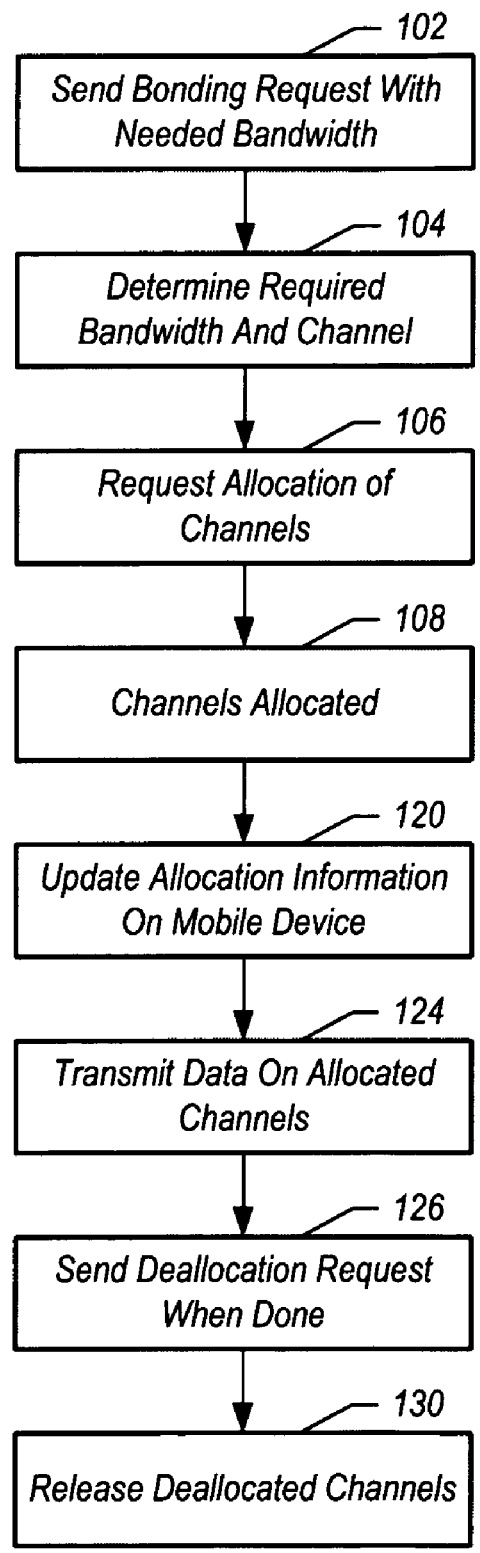
FIG. 1D shows an exemplary process for bonding channels.

To adjust for quality of service, the process 10 can determine a desired level of service for one of the media during a transmission, and dynamically adjust a number of time slots assigned to the media during the transmission to remain within limits of said desired level of service. The dynamic adjusting can further include determining available time-slot resources; detecting the medium that fails to meet said desired level of service; allocating the medium to a configuration having a additional time slots, and transmitting an additional channel assignment message including information on the allocated configuration with the additional time slots. The transceivers for the first and second media can be instructed to communicate only in their newly allocated time-slots.

FIG. 1B shows a second embodiment, shown as a process 30, to handle data transmission over first and second media that overlap in frequency. The process 30 selects one of the first and second media as a common medium (step 32) and routes the data transmission through the common medium (step 34).

In the second embodiment of FIG. 1B, one standard is selected as the default communication medium. For example, if 801.11 standard were the standard medium, Bluetooth data is encoded into 802.11 data and transmitted using the 802.11 transceiver, and vice versa. As such, the process 30 is equivalent to two 802.11 transceivers operating over the 2.4 GHz band without interference.

Turning now to FIG. 1C, a third process 70 for data transmission over first and second media that overlaps in frequency is shown. The process 70 selects one of the first and second media as a common medium (step 72) and instructs transceivers for the first and second media to communicate only through the common medium (step 74).

The processes 10, 30 and 70 can further allow a single mobile station to transmit on multiple cellular frequency channels that have been "bonded" or linked together for the purpose of the transmission. Each channel contains one or more frames, and a single mobile station can transmit on multiple time slots of the same TDMA frame (multi-slot operation). This results in a very flexible channel allocation: one to one hundred twenty four (124) frequency channels (or one to 62 channels for 200 kHz channel spacing interleaved systems), with one to eight time slots per TDMA frame can be allocated for one mobile station. Moreover, uplink and downlink are allocated separately, which efficiently supports asymmetric data traffic (e.g., Web browsing).

First, the process of FIG. 1D receives a request to communicate one or more files with a data transmission size (step 102). Based on the transmission size and known channel bandwidth, the process computes the number of frequency channels that are needed (step 104). Next, the process requests an allocation of cellular frequency channels from a mobile station to a base station (step 106). In response, the base station looks up available (open) frequency channels in its memory storage and allocates available frequency channels in response to the request from the mobile station (step 108). Information on the allocated channels is sent to the mobile station to set up its transceiver to capture data on all allocated channels (step 120). The information can include a list with channel identification or channel frequency, or alternatively can include a starting channel and channel spacing, or can include a starting channel and frequency hopping information, for example.

Once the mobile station sends an acknowledgement that it has set up its RF circuitry to receive data over a plurality of frequency channels, the base station can transmit data over the plurality of frequency channels (step 124). In this manner, the allocated frequency channels are bonded together to communicate data with high bandwidth. Upon conclusion of data transmission, the mobile station sends a deallocation request to the base station (step 126), and the base station in turn releases the deallocated channels for other transmissions or for supporting additional users (step 130).

Figure 1E:
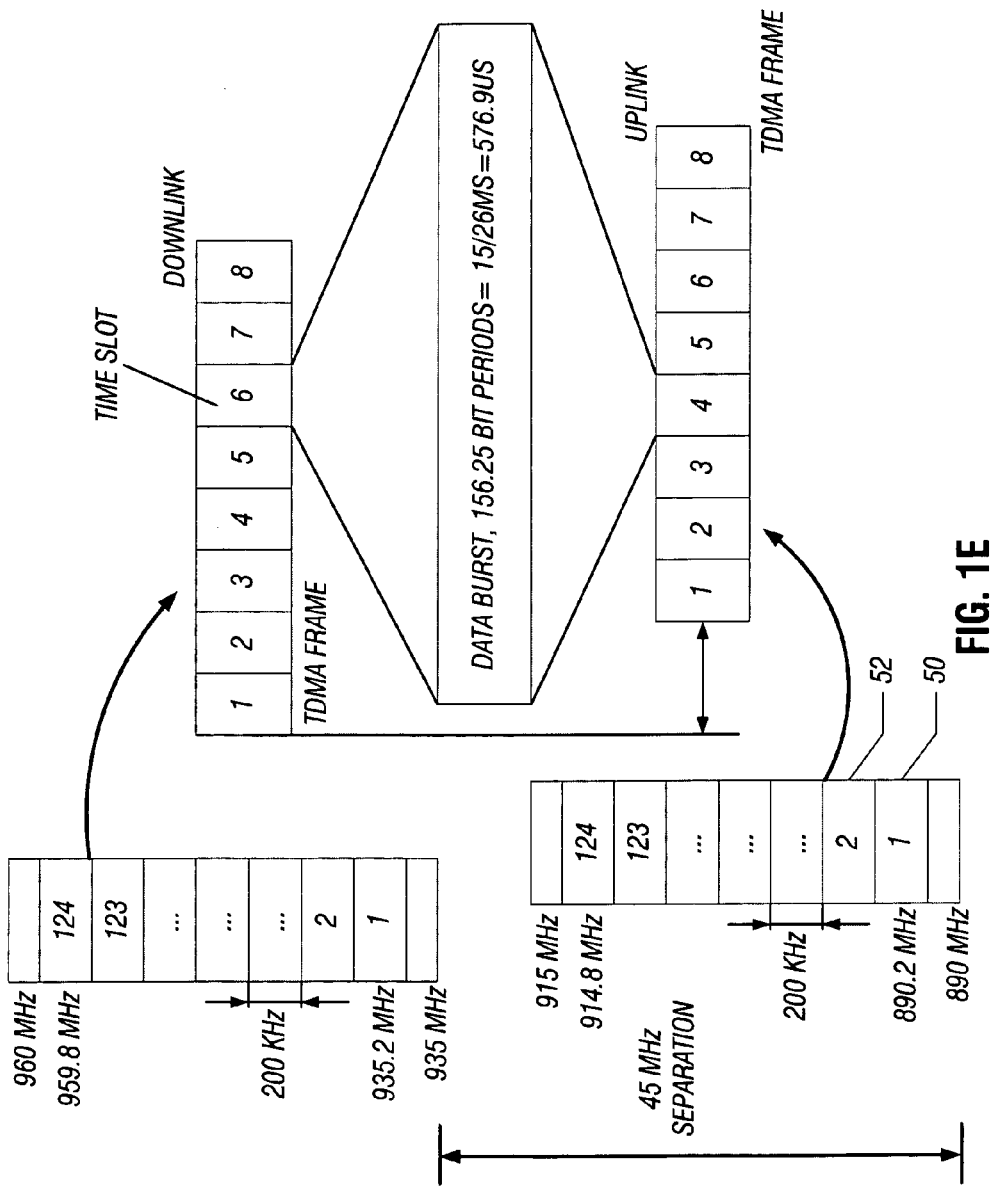
FIG. 1E further illustrates exemplary data transmission using bonded channels.

FIG. 1E further illustrates exemplary data transmission using bonded channels In the embodiment of FIG. 1E, the mobile station contains one transmitter/receiver pair that transmits on an uplink band around 890–915 MHz for the uplink (direction from mobile station to base station) and receives on a downlink band around 935–960 MHz for the downlink (direction from base station to mobile station). The 25 MHz bands are then divided into 124 pairs of frequency duplex channels with 200 kHz carrier spacing using Frequency Division Multiple Access (FDMA). A cell can use two adjacent channels, and the channel spacing can be said to be 200 kHz interleaved. TDMA is used to split the 200 kHz radio channel into 8 time slots (which creates 8 logical channels) A logical channel is therefore defined by its frequency and the TDMA frame time slot number.

In one exemplary sequence in the embodiment of FIG. 1E, the mobile station requests two channels, and in this example, channels 50 and 52 in FIG. 1E at 890.2 MHz and 890.4 MHz are available. The base station responds by sending the 890.2 and 890.4 MHz frequency identification to the mobile station. The mobile station in turn updates its transceiver with the frequency information, and the transceiver can listen for data in all frames associated with the 890.2 and 890.4 MHz channels. In this example, two frequency channels have been bonded together to increase transmission bandwidth.

Although the above example illustrates a static allocation, the allocation of channels can be performed dynamically, depending on the current traffic load, the priority of the service, and the multi-slot class A load supervision procedure monitors the transmission load in each cell. According to the current demand, the number of channels can be changed. Channels not currently in use by conventional GSM/GPRS/EDGE can be allocated to increase the quality of service. When there is a resource demand for services with higher priority, channels can be de-allocated. Hence, channels are only allocated when data packets are sent or received, and they are released after the transmission. For bursty traffic this results in an efficient usage of wireless resources and multiple users can share a group of channels to obtain the necessary bandwidth.

Figure 2A:
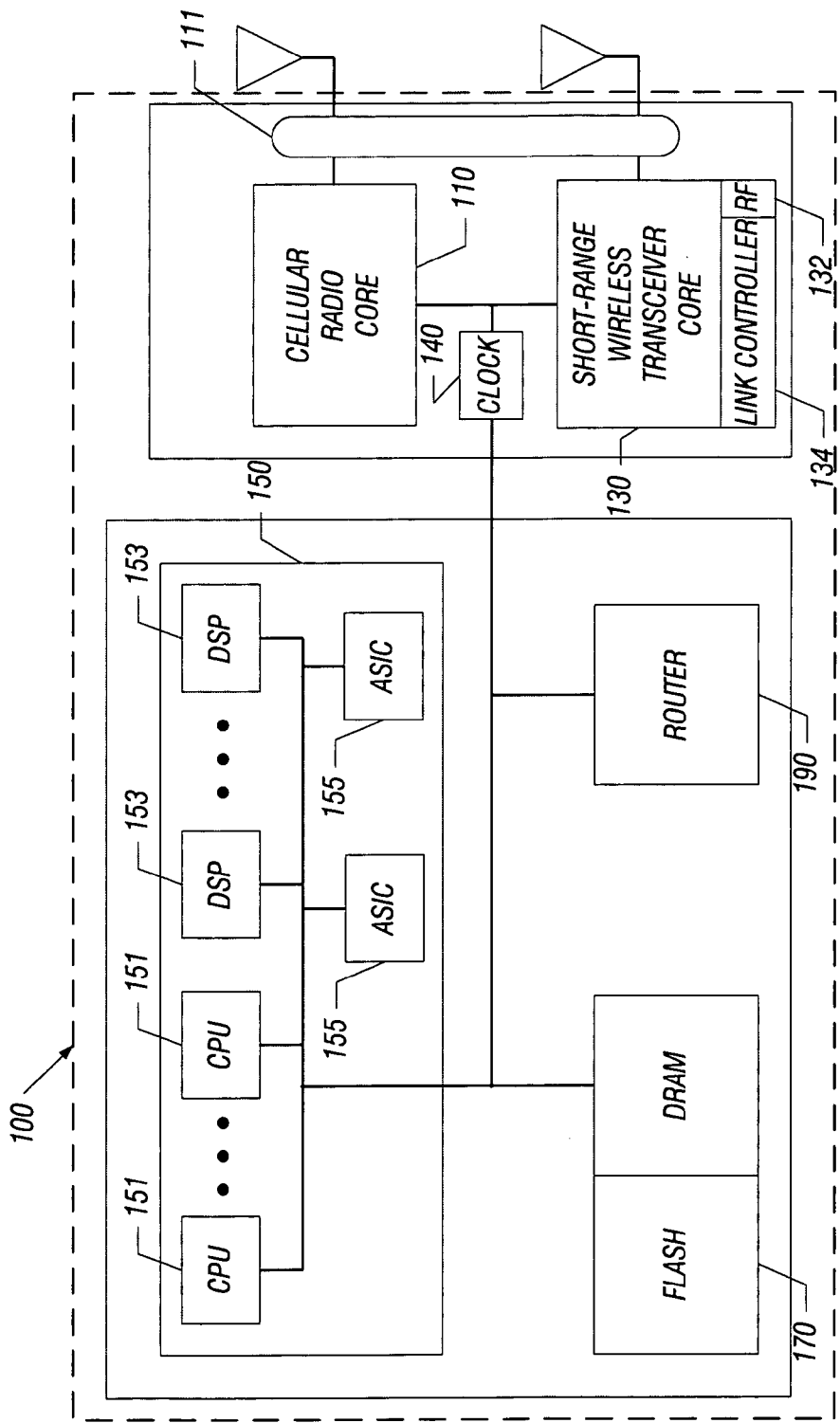
FIG. 2A shows a block diagram of a multi-mode wireless communicator device fabricated on a single silicon integrated chip.

FIG. 2A shows a block diagram of a multi-mode wireless communicator device 100 fabricated on a single silicon integrated chip. In one implementation, the device 100 is an integrated CMOS device with radio frequency (RF) circuits, including a cellular radio core 110, a plurality of short-range wireless transceiver cores 130 that can include Bluetooth cores and 802.11 cores, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more processors 151 such as MIPS processors and/or one or more digital signal processors (DSPs) 153, among others. The reconfigurable processor core 150 has a bank of efficient processors 151 and a bank of DSPs 153 with embedded functions. These processors 151 and 153 can be configured to operate optimally on specific problems and can include buffers on the receiving end and buffers on the transmitting end such the buffers shown in FIG. 1. For example, the bank of DSPs 153 can be optimized to handle discrete cosine transforms (DCTs) or Viterbi encodings, among others. Additionally, dedicated hardware 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver cores 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver cores 130 support local area network (LAN) access. The reconfigurable processor core 150 has embedded read-only-memory (ROM) containing software such as IEEE802.11, GSM, GPRS, Edge, and/or Bluetooth™ protocol software, among others.

In one embodiment, the cellular radio core 110 includes a transmitter/receiver section that is connected to an off-chip antenna. The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of transmitter/receiver section 112, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I,I,Q,Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134 The processor core 150 controls the link controller core 134. In one embodiment, the RF modem core 132 has a direct-conversion radio architecture with integrated VCO and frequency synthesizer. The RF-unit 132 includes an RE receiver connected to an analog-digital converter (ADC), which in turn is connected to a modem performing digital modulation, channel filtering, AFC, symbol timing recovery, and bit slicing operations For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver cores 130 are powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver cores 130 to search for a Bluetooth™ channel or an 802.11 signal, for example. If Bluetooth™ signals are detected, the phone sends a de-registration message to the cellular system and/or a registration message to the Bluetooth™ system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ or the 802.11 channel.

According to one implementation, when the short-range wireless core 130 in the idle mode detects that the short-range signals such as the 802.11 and/or Bluetooth™ signals have dropped in strength, the device 100 activates the cellular radio core 110 to establish a cellular link, using information from the latest periodic ping. If a cellular connection is established and 802.11 and/or Bluetooth™ signals are weak, the device 100 sends a deregistration message to the 802.11 and/or Bluetooth™ system and/or a registration message to the cellular system. Upon registration from the cellular system, the short-range transceiver cores 130 is turned off or put into a deep sleep mode and the cellular radio core 110 and relevant parts of the synthesizer are powered up to listen to the cellular channel.

The router 190 can send packets in parallel through the separate pathways of cellular or 802.11 and/or Bluetooth™. For example, if a Bluetooth™ connection is established, the router 190 knows which address it is looking at and will be able to immediately route packets using the Bluetooth standard Similarly, if the 802 11 connection is established, the router 190 uses this connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth™) to make sure some of the packets arrive at their destinations. However, if the signal strength is adequate, the router 190 prefers the 802.11 and/or Bluetooth™ mode to minimize the number of subscribers using the capacity-limited and more expensive cellular system at any give time. Only a small percentage of the devices 100, those that are temporarily outside the 802.11 and/or Bluetooth coverage, represents a potential load on the capacity of the cellular system, so that the number of mobile users can be many times greater than the capacity of the cellular system alone could support.

Figure 2B:
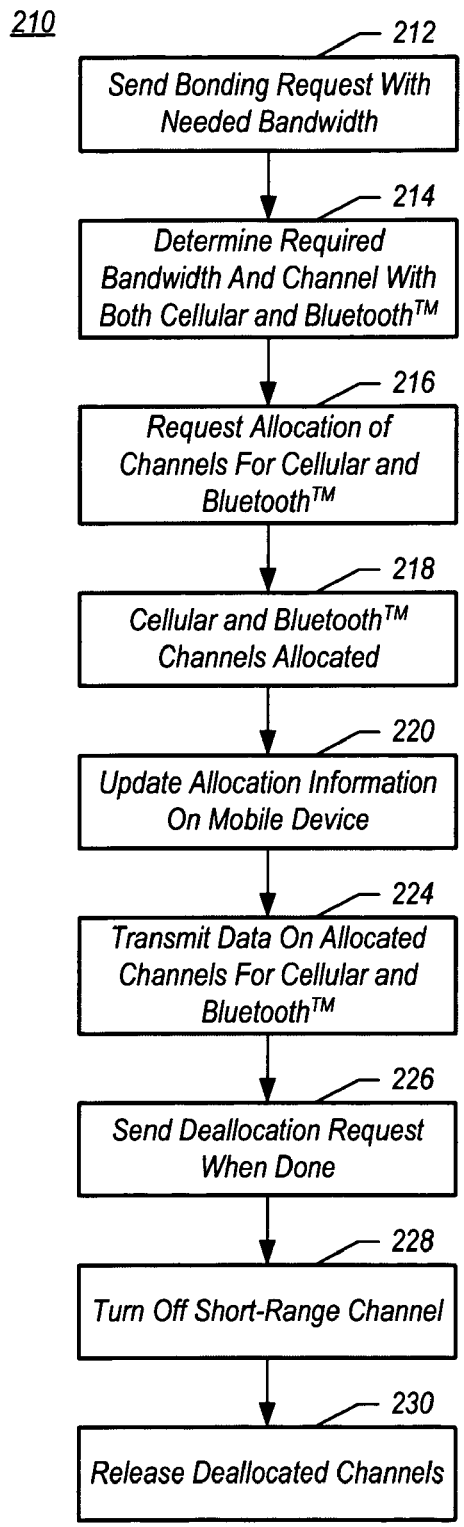
FIG. 2B shows an exemplary second process to bond cellular channels and 802.11 and Bluetooth channels together to further increase transmission speed for the system of FIG. 2A.

FIG. 2B shows an exemplary second process 210 to bond cellular channels and 802.11 and/or Bluetooth channels together to further increase transmission speed. The process 210 receives a request to communicate one or more files with a data transmission size (step 212). Based on the transmission size and known cellular and 802.11 and/or Bluetooth channel bandwidth, the process 210 computes the number of frequency channels that are needed (step 214). Next, the process 210 requests an allocation of cellular frequency channels from a mobile station to a base station (step 216). In response, the base station looks up available (open) frequency channels in its memory storage and allocates available frequency channels in response to the request from the mobile station (step 218). Information on the allocated channels is sent to the mobile station to set up its transceiver to capture data on all allocated channels (step 220). Once the mobile station sends an acknowledgement that it has set up its RF circuitry to receive data over a plurality of frequency channels, the base station can transmit data over the plurality of frequency channels and the 802.11 and/or Bluetooth channel (step 224). In this manner, the allocated frequency channels are bonded together to communicate data with high bandwidth using a plurality of long-range and short-range wireless channels. Upon conclusion of data transmission, the mobile station sends a deallocation request to the base station (step 326), and turns off the 802.11 and/or Bluetooth channel (step 328). The base station in turn releases the deallocated channels for other transmissions (step 330).

Figure 3:
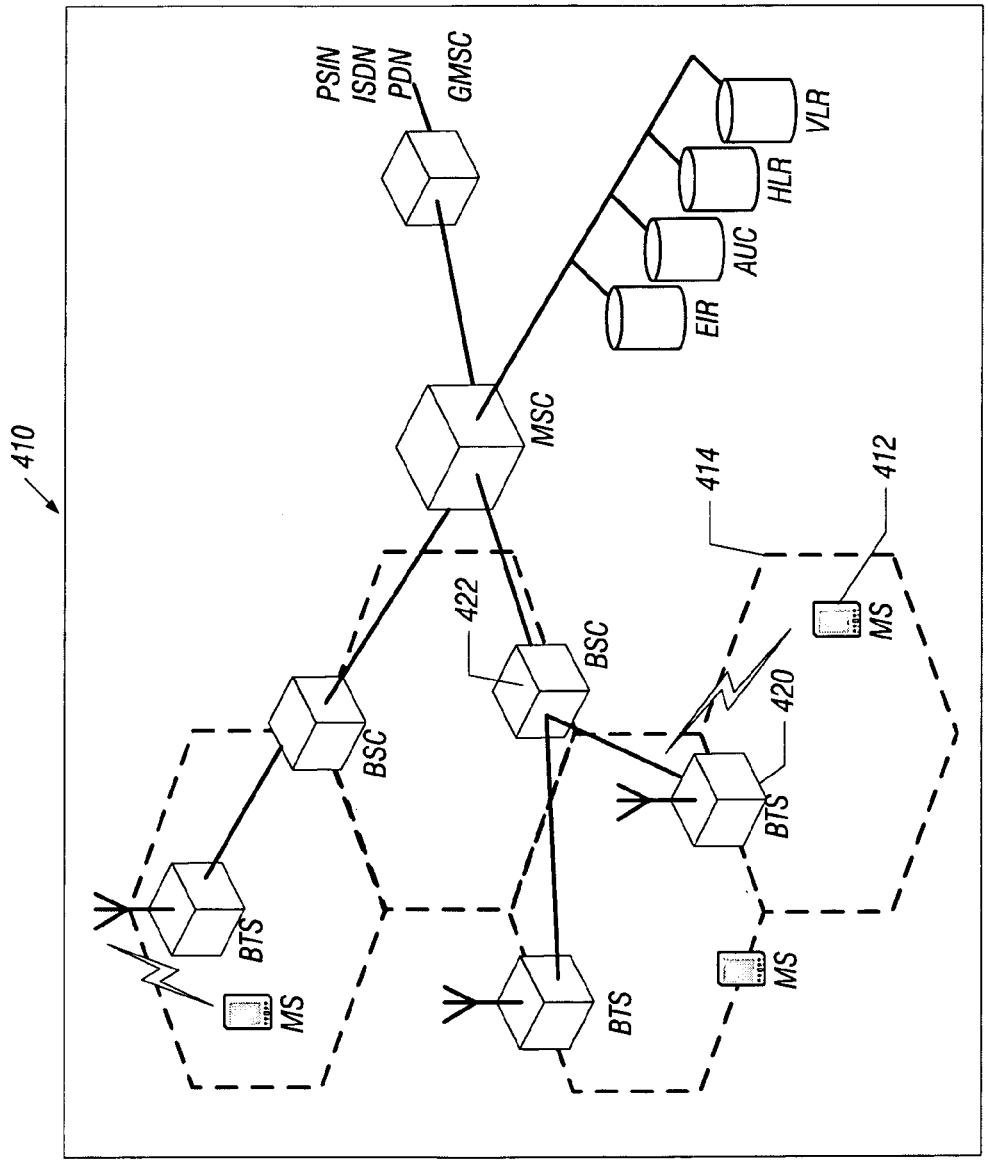
FIG. 3 is a block diagram of a wireless communications system.

FIG. 3 shows a cellular switching system 410. The system 410 has one or more Mobile Stations (MS) 412 that can transmit and receive data on-demand using a plurality of channels bonded together. The system 410 also has a Base Station Subsystem (BSS) 414, a Network and Switching Subsystem (NSS), and an Operation and Support Subsystem (OSS). The BSS 414 connects the MS 412 and the NSS and is in charge of the transmission and reception. The BSS 414 includes a Base Transceiver Station (BTS) or Base Station 420 and a Base Station Controller (BSC) 422.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, although exemplary embodiments using Bluetooth, 802.11, GSM, GPRS, and EDGE are contemplated, the invention is applicable to other forms of data transmission, include radio-based and optical-based transmission techniques.

What is claimed is:

1. A method for data transmission over first and second media that overlap in frequency, comprising:
    computing one or more time division multiple access (TDMA) time-slot channels to be shared between the first and second media for data transmission;
    allocating one or more time-slot channels to the first medium for data transmission;
    allocating one or more of the remaining time-slot channels to the second medium for data transmission; and
    dynamically adjusting a number of time-slot channels assigned to one of the first and second media during the data transmission to remain within limits of a desired level of service.

2. The method of claim 1, wherein at least one of the first and second media conforms to an 802.11 specification.

3. The method of claim 1, wherein at least one of the first and second media conforms to a Bluetooth specification.

4. The method of claim 1, further comprising determining the desired level of service for one of the first and second media during the data transmission.

5. The method of claim 1, wherein the dynamic adjusting comprises:
    determining available time-slot resources;
    detecting the medium that fails to meet said desired level of service;
    allocating the medium to a configuration having additional time slots; and
    transmitting a channel assignment message including information on the allocated configuration with the additional time slots.

6. The method of claim 5, further comprising instructing transceivers for the first and second media to communicate only in their previously presentedly allocated time-slots.

7. A method for data transmission over first and second media that overlap in frequency, comprising:
    selecting one of the first and second media as a common medium;
    instructing transceivers for the first and second media to communicate only through the common medium; and
    retrying a packet transmitted through the common medium at a lower rate if the packet is not acknowledged after transmission at a first rate.

8. The method of claim 7, wherein at least one of the first and second media conforms to an 802.11 specification.

9. The method of claim 7, wherein at least one of the first and second media conforms to a Bluetooth specification.

10. The method of claim 7, wherein the packet is initially transmitted at the highest rate supported by both media.

11. An apparatus comprising:
    a processor;
    a first transceiver coupled to the processor to communicate via a first medium;
    a second transceiver coupled to the processor to communicate via a second medium, wherein at least one of the first transceiver and the second transceiver is to retry transmission of a packet at a lower rate if a prior transmission of the packet is not acknowledged; and
    a circuit to dynamically allocate time-slot channels to one of the first medium and the second medium based upon a desired level of service.

12. The apparatus of claim 11, wherein the processor comprises an integrated circuit having a reconfigurable processor core that includes a plurality of digital signal processors (DSPs).

13. The apparatus of claim 12, wherein the integrated circuit further comprises a router coupled to the reconfigurable processor core.

14. The apparatus of claim 13, wherein the router is configured to bond a plurality of cellular frequency channels and at least one short-range wireless channel.

15. The apparatus of claim 11, wherein the circuit is to select one of the first medium and the second medium as a common medium for data transmission.

16. The method of claim 1, further comprising instructing transceivers for the first and second media to communicate only in their allocated time-slot channels.

* * * * *